US012039314B2

(12) United States Patent
Mathews et al.

(10) Patent No.: US 12,039,314 B2
(45) Date of Patent: Jul. 16, 2024

(54) SYSTEM AND METHODS FOR USING CONTAINER LAYERS TO FACILITATE CLOUD RESOURCE SHARING AND DECREASE STARTUP TIMES

(71) Applicant: Palantir Technologies Inc., Denver, CO (US)

(72) Inventors: John Mathews, Austin, TX (US); Nicholas Gates, London (GB)

(73) Assignee: Palantir Technologies Inc., Denver, CO (US)

( * ) Notice: Subject to any disclaimer, the term of this patent is extended or adjusted under 35 U.S.C. 154(b) by 378 days.

(21) Appl. No.: 17/169,323

(22) Filed: Feb. 5, 2021

(65) Prior Publication Data

US 2022/0229647 A1 Jul. 21, 2022

Related U.S. Application Data

(60) Provisional application No. 63/138,328, filed on Jan. 15, 2021.

(51) Int. Cl.
*G06F 8/61* (2018.01)
*G06F 8/41* (2018.01)
*G06F 9/50* (2006.01)

(52) U.S. Cl.
CPC ............... *G06F 8/63* (2013.01); *G06F 8/433* (2013.01); *G06F 9/5077* (2013.01)

(58) Field of Classification Search
CPC ............ G06F 8/433–63; G06F 9/45533–5077
See application file for complete search history.

(56) References Cited

U.S. PATENT DOCUMENTS 10,291,706 B1 * 5/2019 Zhao .................. H04L 67/1097
10,534,671 B1 * 1/2020 Zhao .................. G06F 9/45558
(Continued)

FOREIGN PATENT DOCUMENTS

EP          4 030 285        7/2022
WO     WO 2020/232713     11/2020

OTHER PUBLICATIONS

Optimising Docker Layers for Better Caching with Nix Graham Christensen Retrieved: grahamc.com/blog/nix-and-layered-docker-images/ (Year: 2018).*

(Continued)

*Primary Examiner* — Charles M Swift
*Assistant Examiner* — Paul V Mills
(74) *Attorney, Agent, or Firm* — Knobbe, Martens, Olson & Bear, LLP

(57) ABSTRACT

A package manager used with a containerization platform can organize code portions into immutable layers. Collections of layers can be organized and saved together as an executable unit. Disclosed solutions recognize that because layers do not change, they can be reused by the same user and can also serve as shared building blocks for multiple environments running simultaneously. To facilitate sharing layers, a system can analyze which ones are common to multiple environments and allow multiple simultaneous environments to share common layers. Layer compression and dominator algorithms can be used to address inherent layer constraints. To facilitate use of existing layers for efficient start-up, code packages can be organized into base layers and additional layers, and commonly-used layers can be cached. New or unique environment requests can combine previously-cached base layers and additional layers to avoid redundant calculations. A just-in-time approach can (Continued)

combine layers into new images on the fly and cache the new images for later use.

8 Claims, 7 Drawing Sheets

(56) References Cited

U.S. PATENT DOCUMENTS

| | | | |
|---|---|---|---|
| 10,552,133 B2* | 2/2020 | Yang | G06F 8/63 |
| 10,684,884 B1* | 6/2020 | Emelyanov | G06F 9/45558 |
| 11,573,814 B1* | 2/2023 | Aithal | G06F 16/188 |
| 2017/0177860 A1* | 6/2017 | Suarez | G06F 9/45558 |
| 2017/0300311 A1* | 10/2017 | Vasquez Lopez | G06F 8/63 |
| 2018/0039524 A1* | 2/2018 | Dettori | G06F 9/4881 |
| 2018/0088993 A1* | 3/2018 | Gerdesmeier | G06F 9/5005 |
| 2018/0095973 A1* | 4/2018 | Huang | G06F 16/1748 |
| 2020/0142680 A1 | 5/2020 | Varadharajan Kannan | |
| 2020/0142801 A1* | 5/2020 | Huang | G06F 11/0751 |
| 2020/0272440 A1* | 8/2020 | Burgazzoli | G06F 8/70 |

OTHER PUBLICATIONS

DupHunter: Flexible High-Performance Deduplication for Docker Registries Nannan Zhao, Hadeel Albahar, Subil Abraham, and Keren Chen, Vasily Tarasov, Dimitrios Skourtis, Lukas Rupprecht, (Year: 2020).*

Efficient Computation of Dominance in Component Systems Jaap Boender (Year: 2011).*

Wale: A solution to share libraries in Docker containers Fabio D'Urso, Corrado Santoro, Federico Fausto Santoro (Year: 2019).*

The Dominance Tree in Visualizing Software Dependencies Raimar Falke, Raimund Klein, Rainer Koschke, Jochen Quante (Year: 2005).*

FastBuild: Accelerating Docker Image Building for Efficient Development and Deployment of Container Zhuo Huang, Song Wu, Song Jiang and Hai Jin (Year: 2019).*

Fast Docker container deployment in Fog computing infrastructures Lorenzo Civolani University of Bologna (Year: 2018).*

Cooper et al., "A Simple, Fast Dominance Algorithm", 2006, retrieved from https://www.cs.rice.edu/~keith/EMBED/dom.pdf, 15 pages.

Lengauer et al., "A Fast Algorithm for Finding Dominators in a Flowgraph", ACM Transactions on Programming Languages and Systems, vol. 1, No. 1, Jul. 1979, pp. 121-141.

Vukotic, "Docker Caching—Introduction to Docker Layers", Oct. 6, 2020, retrieved from https://medium.com/swlh/docker-caching-introduction-to-docker-layers-84f20c48060a, 10 pages.

Official Communication for European Patent Application No. 22151538.0 dated Jun. 10, 2022, 15 pages.

Official Communication for European Patent Application No. 22151538.0 dated Dec. 15, 2023, 6 pages.

* cited by examiner

SYSTEM AND METHODS FOR USING
CONTAINER LAYERS TO FACILITATE
CLOUD RESOURCE SHARING AND
DECREASE STARTUP TIMES

CROSS-REFERENCE TO RELATED
APPLICATION

This application claims benefit of U.S. Provisional Patent Application Ser. No. 63/138,328 filed Jan. 15, 2021, which is incorporated herein by reference in its entirety.

TECHNICAL FIELD

The present disclosure relates to systems and techniques for data integration, analysis, and visualization. More specifically, data comprising program code can be packaged for use in a remote or cloud server system in an efficient manner, allowing parallel and serial use of common code on an ad-hoc basis.

BACKGROUND

Many cloud-based environments have problems with startup latency and cannot safely or sufficiently share resources in computing environments.

SUMMARY

This disclosure provides systems and methods for reducing startup latency and sharing resources in computing environments. A system can track initial user environment request information and code dependencies necessary to establish those environments, and store that information and those dependencies in an environment cache as immutable layers that together form a cached environment. The system can receive a first incoming user environment request and search the environment cache to determine if the requested environment is old (present in the cache) or new (not present in the cache). If the first requested environment is old, the system can use the immutable layers of the cached environment to quickly establish an environment in a physical host, cache the used layers in a layer cache on the physical host, and pass control of that environment to the user, wherein use of cached layers reduces startup latency by a first amount. The system can receive a second incoming user environment request and share resources to establish a corresponding environment on that physical host. The system can do this, for example, by searching the layer cache for layers that are common to the environments of the first and second incoming requests, and using only one instance of each common layer to simultaneously support both environments on the same physical host.

The system can also (or alternatively), if the requested environment is new, perform just-in-time image generation by: using new dependencies to compute new layers; combining the new layers with a base layer to form a new image for the new requested environment; caching the new image in the environment cache; using the new image to establish an environment in a physical host; and passing control of that environment to the user.

The system can also (or alternatively) store information and dependencies in an environment cache as immutable layers. This can be done by decomposing the environment into its dependencies and repackaging those dependencies as individual layers. The system can capitalize on layer immutability to build a custom multi-layer image on the fly that satisfies the first incoming user environment request.

The system can also (or alternatively) significantly decrease the average time it takes to start a distributed cluster for a given environment by a factor of at least five, thereby significantly reducing amount of active processing unit time required for startup.

A method of just-in-time image generation using container layers in a computing environment can include one or more steps. For example, a method can include receiving a user request to establish a first application instance on a server, the application instance requiring user-specified code dependencies. The method can include searching a cache for previously-stored container layers comprising previously-used code dependencies to determine that the first application instance is not a repeat. The method can include retrieving base container layers comprising code dependencies previously used by the user. The method can include computing new container layers according to the user-specified code dependencies. The method can include combining the base container layers with the new container layers to form a custom image. The method can include using the custom image to establish the first application instance on the server.

The method can also (or alternatively) further comprise caching the custom image for possible later use when similar requests are received from the same user.

The method can also (or alternatively) include computing new container layers comprises solving for dependencies and using a dominator algorithm to compress the number of layers and thereby comply with a layer constraint. The layer constraint can require that the total number of layers not exceed a threshold and the dominator algorithm can analyze nodes and paths, combining sub nodes and super nodes where the sub nodes are completely dominated by the dominating super node. The dominator algorithm can include the Lengauer-Tarjan algorithm.

The method can also (or alternatively) include providing for shared resources on the server by: using one or more of the following steps: caching, in a local layer cache on the server, container layers used by the first application instance; receiving a user request to establish a second application instance on a server; searching the local layer cache for layers that are common to both the first and second application instances; and running on that server only a single instance of each common layer, wherein that single instance is shared by both application instances.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with any interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, e.g. forecast, future developments.

Further, any interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, e.g., in memory databases) is limited in various ways (e.g., manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (e.g., processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

DETAILED DESCRIPTION

Overview

Figure 1:
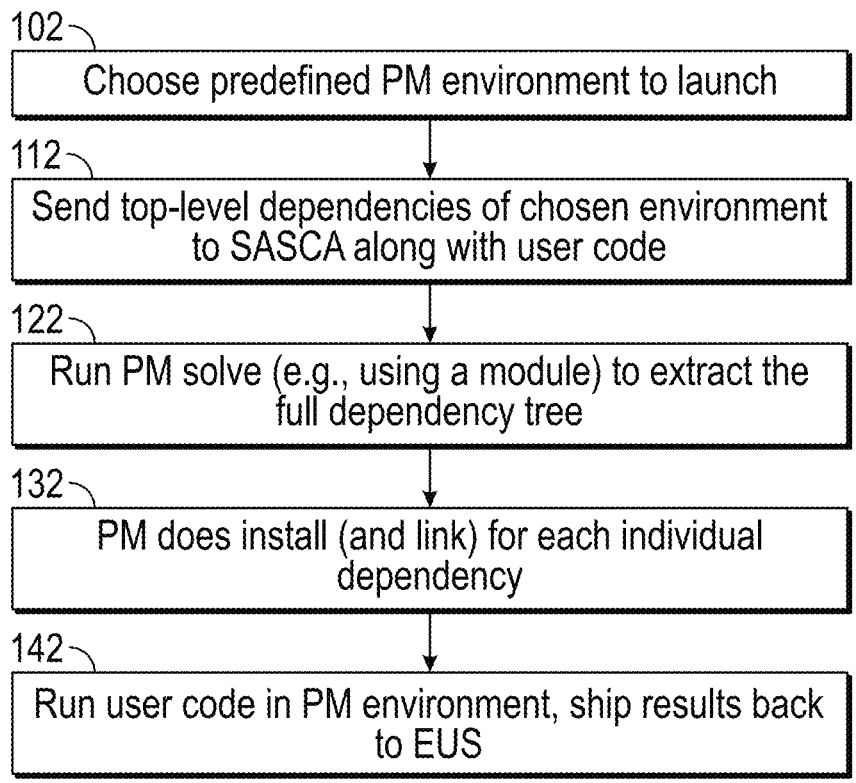
FIG. 1 illustrates a less preferred workflow example with a package manager solve.

To improve efficiency and start-up times, data comprising program code can be packaged for use in a remote or cloud server system in an efficient manner, allowing parallel and serial use of common code, sometimes on an ad-hoc basis.

A package manager used with a containerization platform can organize code portions into immutable layers. Collections of layers can be organized and saved together as an executable unit (e.g., as an image). Because layers do not change, they can be reused by the same user and can also serve as shared building blocks for multiple environments running simultaneously. An environment cache can allow repeat environment requests to be quickly fulfilled. A local layer cache can be used to facilitate layer sharing on a specific server, efficiently using resources for simultaneous environments.

A total number of layers may be constrained to less than the total number of packages needed. An algorithm can compress packages using solved dependencies and a dominator algorithm to recursively compress packages, thereby satisfying a layer constraint.

Layers can be used for just-in-time image generation. Pre-determined base layers can be used, and additional layers specific to a user request can be added to those to create a new ad-hoc image, specific to a new user environment request.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Package: A collection of software and data typically stored in archive files. Packages often contain metadata (name, description of purpose, version, vendor, checksum such as cryptographic hash function, list of dependencies for the software to run, etc.

Package Manager ("PM"): a collection of software tools that manages (e.g., automates or streamlines) the process of installing, upgrading, configuring, and removing computer programs for a computer's operating system and improves consistency of these operations. Using a PM can reduce the need for manual installation and update processes. An example PM is Conda, which runs on Windows, macOS, and Linux. Many Python environments use Conda to handle dependencies. Descriptions referring to Conda herein can also apply more generally to PMs.

End User Software ("EUS"): a program a user requests to run, as facilitated by a service provider. An example EUS can allow users to author code in a browser for application to large datasets. A particular instance of EUS can be referred to as an EUS module.

Virtual Machine ("VM"): an emulation of a computer system. Virtual machines are based on computer architectures. System virtual machines (also termed full virtualization VMs) provide a substitute for a real machine and provide functionality needed to execute entire operating systems. Process virtual machines are designed to execute computer programs in a platform-independent environment. An example VM is an EUS module.

Container: a standardized executable unit of software in which application code is packaged, along with its libraries and dependencies, in common ways so that it can be run anywhere, whether it be on desktop, traditional IT, or the cloud. To do this, containers take advantage of a form of operating system (OS) virtualization in which features of the OS are leveraged to both isolate processes and control the amount of CPU, memory, and disk that those processes have access to. Containers are small, fast, and portable because unlike a virtual machine, containers do not need include a guest OS in every instance and can, instead, simply leverage the features and resources of the host OS. Containers are made possible by operating system (OS) process isolation and virtualization, which enable multiple application components to share the resources of a single instance of an OS kernel in much the same way that machine virtualization enables multiple VMs to share the resources of a single hardware server.

Containerization Platform ("CP"): A software tool that that containerizes an application for portability and reuse. Containerizing can includes packaging an application with its relevant environment variables, configuration files, libraries, and software dependencies. The result is a container image that can then be run on a container platform. An example CP is "Docker." Descriptions referring to Docker herein can also apply more generally to CPs.

Layer (e.g., a CP layer): an instruction or blob of data (e.g., comprising one or more packages that have typically been pre-processed for us in a computing environment) that is used to construct CP images. Unlike packages, layers can be immutable and therefore safer for sharing.

Image (e.g., a CP image such as a Docker image): a self-contained collection of code sufficient to run an application instance, the collection composed of multiple layers.

Artifact: an example of a service that handles package storage.

Dependency: a portion of code used by an application or upon which another software environment depends. Dependencies can comprise packages or layers.

SASCA: Software that helps Automate and Scale Containerized Applications. An example of such software is Kubernetes (Rubix).

Benefits

This disclosure describes how to use CP layer decomposition to reduce startup latency of user-defined PM environments, with specific application to elastic compute platforms, where a user can create, launch, and terminate server-instances as needed, paying by the second (or other short time increment) for active servers. A large amount of interactive tooling is built using package mangers (e.g., Python Conda), but running a PM environment may require a computationally time consuming solve operation to determine the dependencies of the application and create the environment. This disclosure describes decomposing a PM environment into its dependencies, repackaging those dependencies as individual CP layers, and then using those layers to build a custom CP image on the fly that represents the underlying PM environment. These steps combine to significantly decrease the time it takes to start a distributed cluster for a given PM environment (e.g., from 5-20 minutes down to 30 seconds). This can enable significant reduction in the amount of active servers (or other processing units) to compensate for previously slow environment startup times.

This disclosure also describes a way to decompose environments into CP layers which can then be shared across VMs that are running on the same physical hardware, thus decreasing environment startup time further, and reducing network IO. Further, it describes how to use a dominator tree to project the unbounded number of PM packages in the dependency tree down to a bounded number of CP layers while maximizing likelihood of cache hits across the packages. Further it describes a novel approach for JIT (just in time) CP image generation that decomposes the individual layers and recomposes them with a given base image to create unique CP images without the overhead of defining them ahead of time.

Service Provider

A software service provider can provide software that allows users to understand or use their own data better. Institutions may have data useful for making decisions for safety, stability, and prosperity. But too often, their data is fragmented and locked in silos. The people on the front lines of our most important problems don't have the information they need when they need it most. A service provider can help, with software that lets organizations integrate their data, their decisions, and their operations into one platform. Such a service provider can provide software that empowers entire organizations to answer complex questions quickly by bringing the right data to the people who need it. For example, data fusion platforms can be for integrating, managing, and securing any kind of data, at massive scale. On top of these platforms, a service provider can layer applications for fully interactive, human-driven, machine-assisted analysis. Some service provider products can be software tools for searching large data sets and finding connections among data objects, identifying patterns deep within datasets. Another product or platform can link various complicated and diverse systems into a central operating system.

When a user or customer desires to use the products or platforms provided by a service provider, that user may be presented an interface that interacts with cloud servers. The service provider can establish one or more environments. These cloud platforms can provide elastic compute structures that charge fees based on amount of time and amount of resources used.

Problems

When dynamic computations using user-authored code are performed on elastic compute structures (e.g., cloud-based environments that charge for time or resources used), it can be unsafe to have the same user code running on multiple underlying virtual computing environments (e.g., virtual machines). To address this, an isolation or quarantine process can be used to create separate virtual computing environments (e.g., virtual machines, and/or other types of emulations of computing systems or environments) for running code. However, if a user needs to use code portions A, B, and C and a separate user needs to use code portions C, D, and E, separate environments are created. This is inefficient (users are unable to share code portion C) and time consuming (lag time to set up new resources for new environment, including provisioning the host, installing dependencies, launch user code before running). Environment start times can be very slow (experiments show 5-20 minutes, or even hours). One approach, referred to as "warm module queues" is to spin up modules (e.g., aspects of a virtual computing environment, such as container layers and the like) early and keep them running the background. This addresses time problems but not cost problems. CPU waste from warm module queues can be expensive. Analysis showed 62% or more of computing power waste can be from warm module queues, resulting in many dollars of waste per year. For example, if a user desires to apply a visualization package or a machine learning package (custom environments), warm modules may be employed by a service provider to avoid end-user frustration at start-up times. The present disclosure addresses this waste and these problems in a scalable manner.

Solutions

Solutions to the above problems include several approaches that can be combined. A package manager (e.g., Conda) used with a containerization platform (e.g., Docker) can organize code portions into immutable layers. Collections of layers can be organized and saved together as an executable unit (e.g., as a CP image). Disclosed solutions recognize that because layers do not change, they can be reused by the same user and can also serve as shared building blocks for multiple environments running simultaneously.

Environment Cache

An efficient way to facilitate reuse is to save a particular user's requested environment information as a containerization platform image in a cache. Users often request the same environment again, and retrieving an executable image from a cache is much more efficient than rebuilding it from scratch and can avoid the speculative risk and expense of pre-loading a predicted environment in a warm module, just in case the user requests it.

Layer Cache

To facilitate sharing layers, a system can analyze which ones are common to multiple environments in a process called solving dependency trees. Using the resulting solutions and a locally-saved layer cache, a particular server can allow multiple simultaneous environments to share layers that they both have in common. This is particularly efficient for later environment requests using layers that are already in use by previously-established environments.

Layer Compression

Some package managers or containerization platforms impose limits on the number of layers that can be formed or used. To address these constraints, a system can use an algorithm that systematically combines dependencies (packages or code portions used by a particular environment) in a rational way. For example, if a dependency tree has been solved to show nodes and branches, sub-dependencies unique to a node can be combined with a their "dominating" node into a layer. This can be referred to as a "dominator" algorithm. Such an approach can recursively compress packages until an upper layer limit (e.g., 125 layers) has been satisfied for a given environment request.

JIT Images

When a user requests a new environment that has not been previously cached as a self-contained image, a system can still use existing layers for efficient start-up. This can be referred to as just-in-time image formation (JIT). To facilitate this, code packages can be organized into base layers and additional layers. Base layers can include those commonly required for running an operating system or other remote environment typically requested by a given user, for example. These layers can be cached. Additional dependency packages can be stored as separate layers. When a user makes a new or unique (previously un-cached) environment request, the environment can be established by combining previously-cached base layers and additional layers. Using immutable layers as building blocks in this process leverages the speed of a caching process and avoid redundant calculations. JIT can combine layers into new images on the fly (and then cache the new images for later use).

As described above, some solutions can involve a faster way of packing and launching end-user software ("EUS"). EUS can include PM-based environments for various applications that can run on remote (e.g., cloud) servers. The present solutions can solve particular PM environments—e.g., solve dependency trees of multiple simultaneous environments. Solving an environment can involve generating a dependency tree by identifying which dependencies (e.g., portions of code included in packages or layers) are necessary and/or sufficient for an application to run. This can be graphically illustrated by connecting representations of code portions with branches, resulting in a graphical tree structure.

Solving simultaneous trees can do the same for multiple applications (e.g., environments) and correlate dependencies, thereby identifying common code portions, ultimately enabling sharing of those portions. However, not all resources are shared. Thus, "solving" simultaneous environments can involve identifying shared dependencies as well as dependencies that cannot be shared. For example, an application can use code portions A, B, and C, and another application can use code portions C, D, and E. However, the first application may specify (e.g., in a rule), that only versions N or greater of code portion C will suffice. If the second application can run using any version of C, the solution for a simultaneous running of both applications will use the most restrictive common "denominator" for C—that is, C (N or greater). However, if the second application can only use versions of C that are less than N, no solution exists for both applications to share C. A solution may exist for other shared code portions, however. A PM can include a "SAT solver" that performs calculations across an entire dependency space (e.g., recursively or iteratively), thereby creating a large dependency graph that will work for a given environment.

The solutions can also repackage dependencies into CP (e.g., Docker) layers, thereby making them safer to share. This further enables sharing of the common dependencies on multiple virtual machines, capitalizing on the immutable nature of CP layers which makes them safer to share (e.g., less vulnerable to manipulation by user code).

These solutions can also allow building of new CP images on the fly. For example, a base image can be established for a given environment or application. This image can include code sufficient to run EUS, which can include an operating system, such as a Linux distribution. The base can be established by a service provider. To this base, the CP layers are added, providing the functions requested by an end user. This process establishes a hybrid, unique, new CP image, well-suited for the cloud, uniquely identifying a custom environment, that has been created efficiently and on demand.

The solutions discussed here can thus provide two general benefits. One is a materialization of dependency graphs on immutable file systems. The other provides a just-in-time (JIT) CP image. This improves over previous processes that assumed or required that CP images (e.g., Docker images) had to be pre-determined, static, and fully self-contained, rather than modular and dynamically generated.

In some cases (e.g., using EUS), a service provider can identify default environments for given customers, allowing them to establish frequently-used base images. These can include specific dependencies (e.g., packages or layers) that are provided by default in a warm module, for example. However, using these solutions, rather than including default dependences in a warm module, they can be established through an efficient initial process (e.g., script or asynchronous computations) that occurs as soon as the server starts, before any user has logged in. This initial process can create user-specific CP images (e.g., from a caching process of previous CP images used by that user). Obtaining these CP images from cache is more efficient and uses the results of previous solving processes. Even when a user requests a unique, new environment, that user can still be presented a previously-solved (and previously-cached) environment on startup while the new one is synchronously computed in the background for later presentation. Thus, a user can at least use a previously-sought environment while waiting for the new one to be established (e.g., asynchronously computed) behind the scenes. The new environment can be presented or offered as soon as it has been computed or upon a subsequent log-in, for example. Thus, one efficiency aspect can allow a subsequent user request to benefit from previous server time and server calculations, leveraging a caching process.

Workflow Examples

FIG. 1 shows a less preferred workflow example. At 102 a user chooses a predefined PM environment to launch. At 112, top-level dependencies that make up that environment are sent to SASCA along with user code. At 122, a module runs a PM solve to extract the full dependency tree. At 132, the PM does an install (and link) for each individual dependency. At 142, the user code runs in that PM environment and ships results back to EUS.

Figure 2:
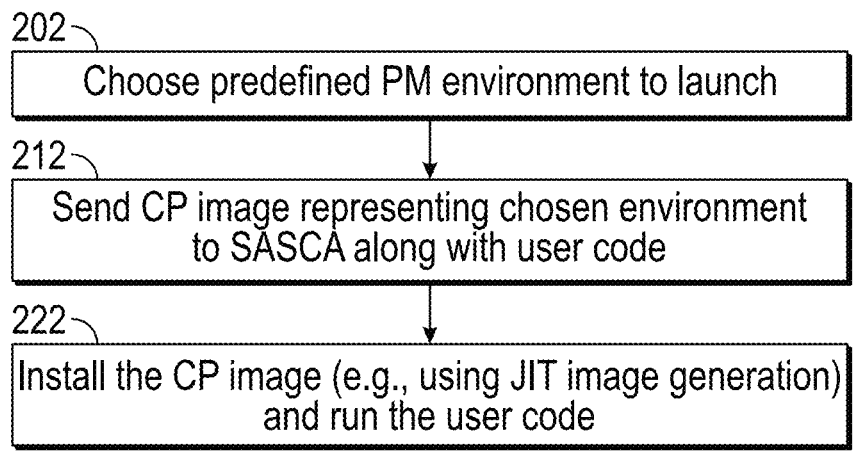
FIG. 2 illustrates a more preferred workflow example using a containerization program image from cache.

FIG. 2 shows a preferred workflow example. At 202, a user chooses a predefined PM environment to launch. At 212, a CP image representing that environment is sent to SASCA, along with user code. At 222, SASCA installs that CP image and runs the user code. In this approach, a decomposition is applied to a PM environment and just-in-time (JIT) CP image generation can be used.

Additional advantages of the workflow of FIG. 2 include that PM solves and installs are extremely computationally expensive (e.g., a solve can require 3-30 minutes and an install can be approximately 1 minute). This time can be reduced or eliminated when using a CP image. For example, pulling down a CP image can require less time (e.g., in the range of 15-40 seconds). Moreover, generally PM environments cannot safely share cached dependencies across VMs whereas CP layers can be safely shared across all VMs on a physical host (e.g. due to the immutability of CP layers in the layer cache of a CP, e.g., containers, and other container runtimes).

The described inventions can improve the time it takes to startup distributed compute clusters that run customer defined PM environments. This efficiency can be improved where a software service provider controls or manages the versions of a few core packages—the "runtime"—thus reducing the amount of spare compute a software service provider must have available or running to compensate for the historically slow cluster startup times. The benefits and descriptions provided here can apply to various PMs. For example, in addition to Conda, other PMs that use Directed Acyclic Graphs (DAG-based PMs) such as Node Package Manager (NPM), Wheels, Jars, etc. can all be improved by or deployed with the teachings of the present disclosure.

In some embodiments, a CP layer can be provided for each individual dependency, allowing for caching (and sharing) at a highly granular level. However, some CPs (e.g., Docker) limit the total number of layers (e.g., 125 or 127 layers). Removing or expanding this limit thus provides benefits. However, this limit can be required by or inherent in an operating system such as Linux. Thus, alternatively, layers can be combined, grouped, or otherwise compressed to address a PM layer constraint. For example, layers can be merged to address a layer limit present in some PMs.

Package Size and Installation Considerations

Some embodiments address tradeoffs between the granularity between the atomic units of installation. Smaller units (e.g., PM packages) can reduce storage requirements. For example, they can be packed more tightly by reducing dead space between units. On the other hand, larger units may be more efficiently installed once packaged up. Larger units may require more repackaging when the environment requests are heterogenous. In some embodiments, repackaging can result in larger packages in order to speed up installation under the assumption that environment requests are relatively homogeneous.

Some PM packages can be constructed at a highly granular level (e.g., the most granular level possible). Nevertheless, constructing an environment out of them can be inherently more expensive than using CP layers. For example, a "solve" can take more time using PM packages than it would take using PM layers. Solve can be a process by which a PM determines the dependency tree. This can be inherently expensive, especially if packages are used rather than layers. Solve using packages can take more time and therefore require more time/money/computing resources on a critical path of using the PM package manager+PM packages. Linking can also take more time with packages versus layers. A linking step may be required for PM packages in order to run arbitrary installation code. This can be time consuming depending on the package and can also be inherently unsafe. Download can also take more time with packages versus layers. For example, PM packages are not always safe to share across VMs. This does is typically not true for CP layers because they are considered immutable (e.g., not vulnerable to manipulation by user code).

In some embodiments, an automating system or SASCA can assist to automate deployment, scaling, and management of containerized applications. For example, CP (e.g., Docker) images can run using a SASCA such as Kubernetes and/or Rubix. However, if CP images require a particular automating system, a separate code path can be provided in a more fundamental programing language. For example, a separate code path in EUS for Yarn environments (Yarn is a package manager that doubles down as project manager) can use a PM "specFile" and skip the solve step entirely. Even when such an approach is deployed (thereby removing time benefit of the solve step's asynchronous background computation), it may still require approximately 2-3 minutes to simply pull and install the packages for the environment, compared to approximately 20-40 seconds in a CP layer version of the environment. In some embodiments, this benefit results from the lack of cache reuse and the pre, and postlink steps that PM packages undergo.

A benefit of using a CP layer instead of packages (which, for example, can represent raw primitives) is to take advantage of setup and installation steps that have already been applied to those layers such that they already comprise valid Python dependencies.

PM package installations (e.g., PM installations that do not use layers), can have undesired side effects. For example, this can make such installations inherently less safe. An advantage of using a "CP layer view" of the environment is an improvement in safety. This can result from the pre-processing that creates a layer, for example. By the time a CP layer has been established, (e.g., a layer representing a PM package), side effects have already occurred—for example, have been executed and have become immutable.

Benefits of JIT

In connection with the disclosed systems and approaches, just-in-time image generation ("JIT") can combine the benefits of large packages (e.g., faster installation with relatively homogeneous environment requests) with the flexibility or other benefits of small packages. It can efficiently break down a large "package" (e.g., a full PM environment) into discreet pieces that can be added, edited, or deleted at runtime.

JIT can efficiently generate custom CP environments at runtime, upon request, to represent unique EUS instances. This approach can leverage the structure of a CP image, and the fact that images are comprised of layers, adding layers on the fly to existing CP images to generate a new CP image without the overhead of declaratively defining that particular CP image ahead of time. A system can facilitate this by determining which CP layers are needed and retrieving them from a cache. The reuse of already existing layers combined with additions of new layers allows for a high level of cached layer reuse and a more dynamic way of creating images.

Older approaches hard coded CP images and were thus more static than the dynamic process described here as a JIT approach. In contrast, the present disclosure provides a service that starts with a base image and creates CP images that can be pulled down from container registries. This provides all the performance benefits of a CP (e.g., cache sharing and layer sharing), but without the inflexibility of statically knowing beforehand all that will eventually be needed. The present approach avoids changing static files, recompiling (e.g., locally), building (e.g., locally), recomputing, publication, etc. To facilitate the present approach a customized service can interface with representations of CP images and allow interaction with those CP images.

Figure 3:
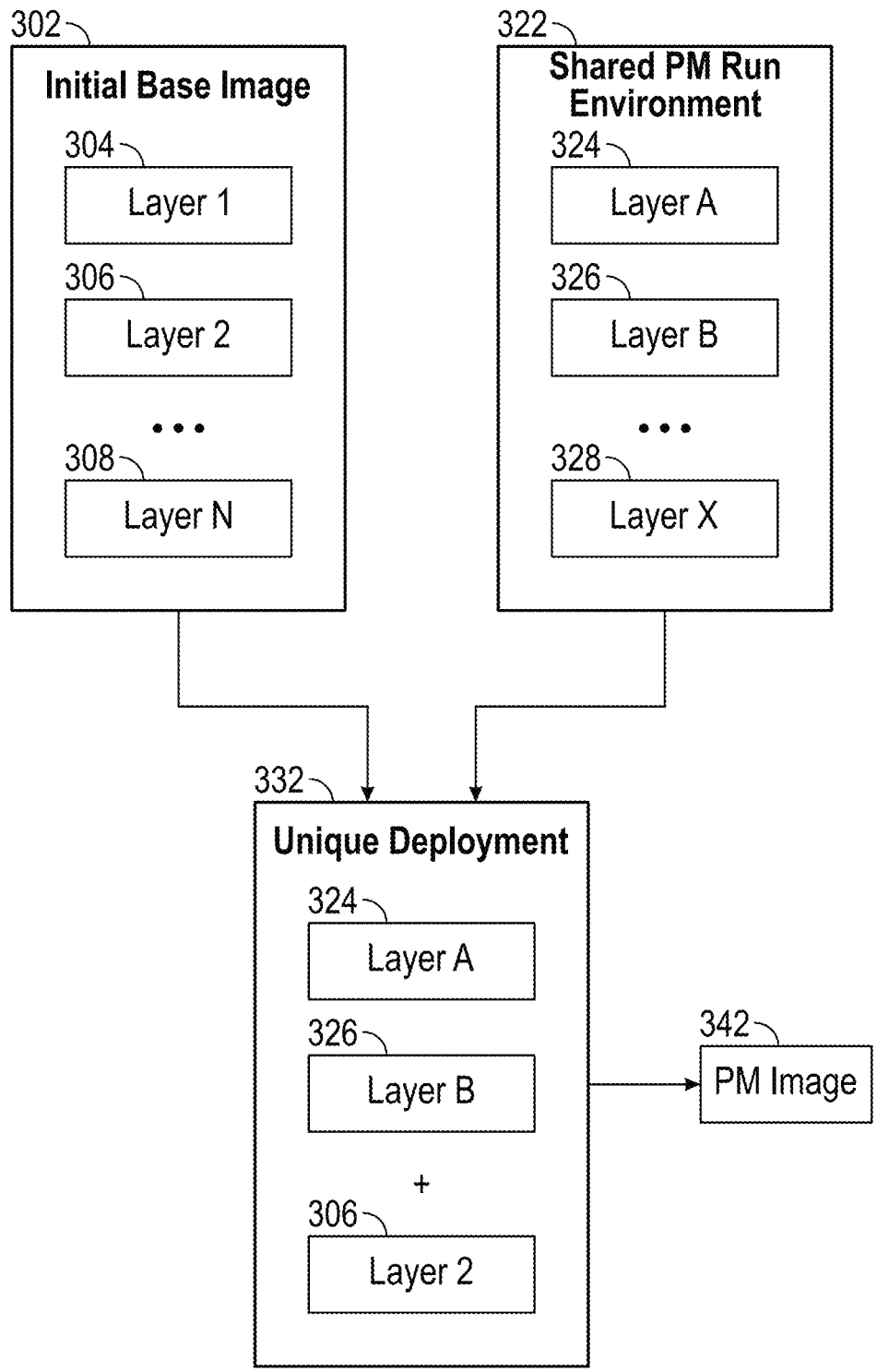
FIG. 3 illustrates a just-in-time containerization program image generation process using layers that results in a package manager image.

FIG. 3 illustrates how JIT can allow a user to take one or more layers 304, 306, 308 from an initial base image 302 (e.g., the code intended for all of related services to share), combine those layers with layers 324, 326, 328 from the PM environment 322 (e.g., the environment needed to run user code, which can be shared with others who have the same dependency tree), and then apply user-authored code 334 as an additional layer 332 (e.g., a layer unique to that given user/deployment) to create a PM image 342 that uniquely represents the initial base image 302.

In an example consistent with FIG. 3, FML-Live enables users to launch a custom user-authored python service that can service requests to evaluate machine learning decisions. Using JIT, a user can take layers from an initial base image (the code intended for all of related services to share, e.g. a flask server), combine those layers with layers from the PM environment needed to run the user code (code that can be shared across multiple sets of users who have the same dependency tree), and then apply the user authored code as an additional layer (e.g., a layer unique to that given user/deployment) to create a CP image that uniquely represents that user authored service.

The above-describe approach can be enabled or improved as CP (e.g., Docker) images can be represented as a manifest file containing pointers to existing hashs (e.g., shasums) of individual layers. When a CP client pulls an image, it can read the manifest file and pulls each individual layer described in that file. This structure can be used to read a base manifest file, extract out the layers (e.g., layers 324, 326), and create a new manifest file with arbitrary new layers (e.g., layer 306) to create a unique CP image (e.g., unique deployment 332). The described approach differs from standard CP image definitions in that standard CP image definitions are statically defined ahead of time, and are seen as immutable once created. In contrast, the described approach generates images on the fly, at runtime. This enables the present approach of effectively patching user code onto a relatively static code base in an efficient way for deployment.

Figure 4:
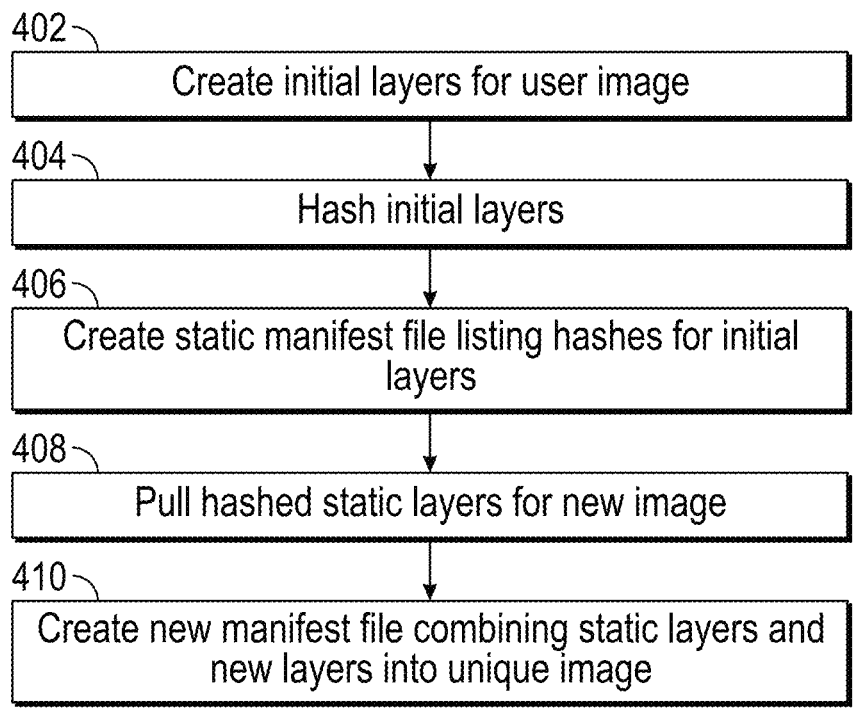
FIG. 4 illustrates a process implementing a just-in-time process consistent with FIG. 3.

FIG. 4 illustrates a process implementing the described JIT approach. At 402, initial layers are created. At 404, those layers are hashed. At 406, those hashes are listed in a static manifest file. At 408, an image is pulled by reading the manifest file and pulling the described static layers from the hash information. At 410, a new manifest file is dynamically created that combines static layers with dynamic new layers for an efficient but unique deployment for a user's image.

Figure 5:
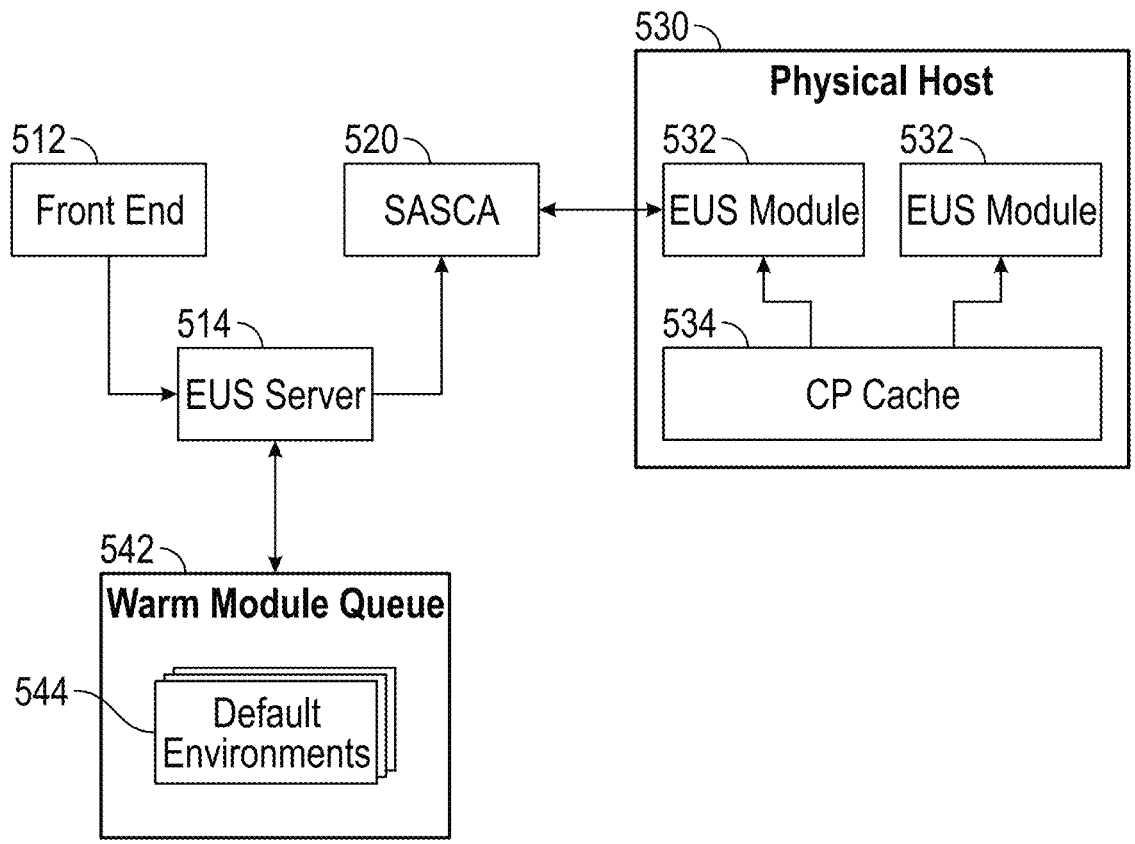
FIG. 5 illustrates a warm module queue approach for establishing an instance of end-user software on a server.

FIG. 5 illustrates one approach that uses a less efficient "warm module" approach. This can help avoiding delay and decrease cost for an end user, but a service provider may have to bear the cost and risk of maintaining sufficient warm modules. This approach doeos not rely on JIT image generation. A front end 512 can originate a request for an environment (e.g., from an end user). In response, an EUS server 514 can request resources from a warm module queue 542. The queue 542 can use one of multiple default environments 544. The EUS server 514 can then use a SASCA process 520 to interact with a physical host 530, thereby establishing an EUS module 532. This may interact with a Docker cache 534, for example.

Figure 6:
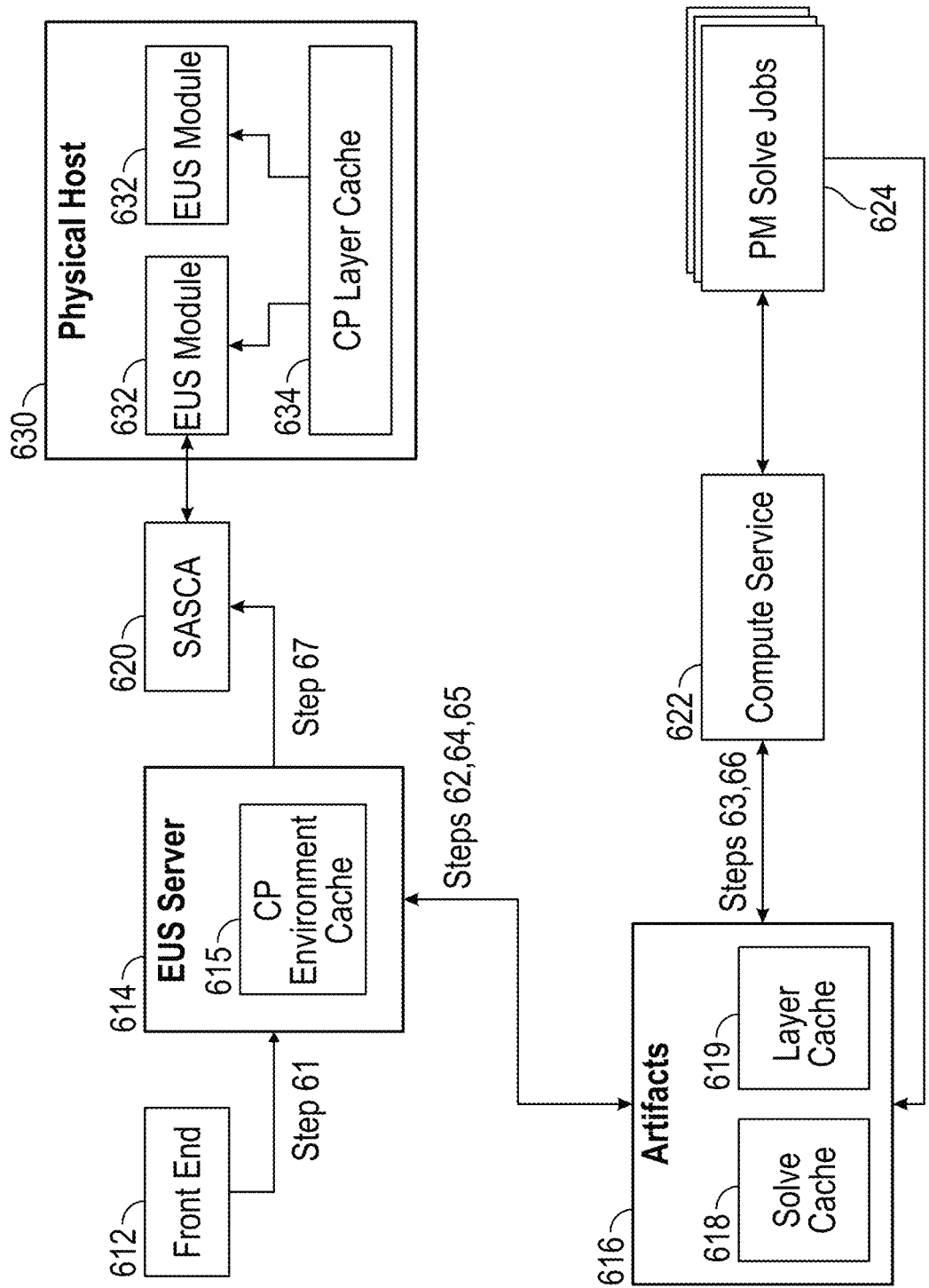
FIG. 6 illustrates a just-in-time image generation approach for establishing an instance of end-user software on a server.

FIG. 6 illustrates an example of a structure, system, and process for accepting a client request and efficiently preparing a module for client interaction. A CP layering process can be used for an application (e.g. an EUS) to run on a remote (e.g., cloud-based) server. This can use a package storage service (e.g., Artifact). FIG. 6 shows an example of how an asynchronous, or JIT, process can reduce or eliminate need for warm modules. To prepare, images may be computed and saved in a Docker environment cache 615.

At step 61, a user requests a module using a front end 612 to an EUS server 614. This request can include the user specifying their new code and its dependencies. Pre-computation and caching of such images (using immutable building blocks) can enhance the probability that the newly-requested module will use material from the cache. In many cases, a user requests the same module again, so the entire image may already be cached and ready to be sent directly to a physical host 630 (e.g., a low trust Kubernates cluster). Server 614 responds by searching its cache (e.g., Docker environment cache 615).

In many cases, the server 614 finds cache hits and responds by providing a CP image for those particular dependencies, already computed, that can be run. At step 67, this is then passed to an intermediary (e.g., SASCA) that pulls down the image (or finds layers cached already in the CP layer cache 634) to create a brand new EUS module 632 at the physical host 630. The server 614 can then pass control of the module 632 to the user to run their code against.

In a more unusual (asynchronous) case, a cache hit is not found within the Docker environment cache 615, indicating a corresponding image has not yet been computed. This can occur, for example, when a server starts for the first time on brand new stack, a user requests a unique custom environment, etc. This process can involve multiple interactions between a server 614 (e.g., EUS server) and a service 616 (e.g., Artifacts).

Solve Step

In a first interaction or step 62, server 614 can reach out to a service 616 (e.g., Artifacts service) for an environment solve for the specifically requested packages. In step 63, the service 616 (e.g., Artifacts) engages a compute service 622 to run a solve job 624 (e.g., a SASCA PM solve job). The solution or result is then posted back to a service 616 (e.g., Artifacts) and stored in a solve cache 618. The stored information can comprise, for example, the results of a dependency tree, which can comprise a correlation between a set of top level dependencies and a corresponding (usually larger) set of sub-dependencies. The results are also passed back to a server 614.

Layer Step

In a second interaction or step 64, the server 614 (e.g., an EUS) can also (e.g., subsequently) request from a service 616 (e.g., Artifacts) the CP layers corresponding to the provided dependency tree. The service 616 can then perform a similar operation using a compute service 622 to repackage the dependencies or calculate a dominator tree, thereby compressing to satisfy any layer limitations. This step can be referred to as layer compaction. The result of each underlying job 624 is a CP layer. Resulting layers are stored in a layer cache 619. The service 616 (e.g., Artifacts) then provides the server 614 with docker digests (e.g., a key or unique identifier tag) for each of those layers.

Image Step

The server 614 now has access to the relevant additional layers, but layers are not self executing. Accordingly, in a third interaction or step 65, the server 614 can then perform a JIT process. This can be referred to as an image repackage step. For example, it can then patch the additional layers on top of a relevant base image. At a request from a server 614, the service 616 (e.g., Artifacts) can combine base layers with relevant additional layers, on the fly and quickly return a new image in the form of a single digest that represents all the information contained in the dependencies and the base image. Specifically, in step(s) 66, a service 616 (e.g., Artifacts) uses a compute service 622 to establish the base and additional layers for the digest. The server 614 caches this digest into its docker environment cache 615, then establishes a new EUS module 632 similarly to how this process is described above. In step 67, the EUS server 614 calls to SASCA 620 with the CP tag, and the SASCA launches with a corresponding CP image. EUS module 632 then runs and is ready for client interaction.

It is useful to decompose or separate the solve, layer, and image steps described above for the asynchronous case. The isolated steps can be useful by themselves, so the three processes can be called individually if needed.

Hardware Resource Sharing

Within the physical host 630, a CP layer cache 634 may be shared across multiple VMs (virtual machines or EUS modules 632) running there, as shown. The VMs may not be aware of this sharing process but it can still be highly efficient for resource use and cost. For example, if two images share half of their layers, download and extraction costs are not duplicated between them for those shared layers. Immutability of CP layers helps enable this. The system and process can also read the layer and check a chasum to confirm the layer has not be tampered with prior to reusing it. In many situations, shared layer percentages can be much higher than 50%. Often, sharing is closer to 80% to 90% on average (e.g., as measured by average cache hit rates). This is also faster, since downloading an environment from scratch may require 1-2 minutes, layer sharing can reduce that time to 8-10 seconds.

Layer Compression

Figure 7:
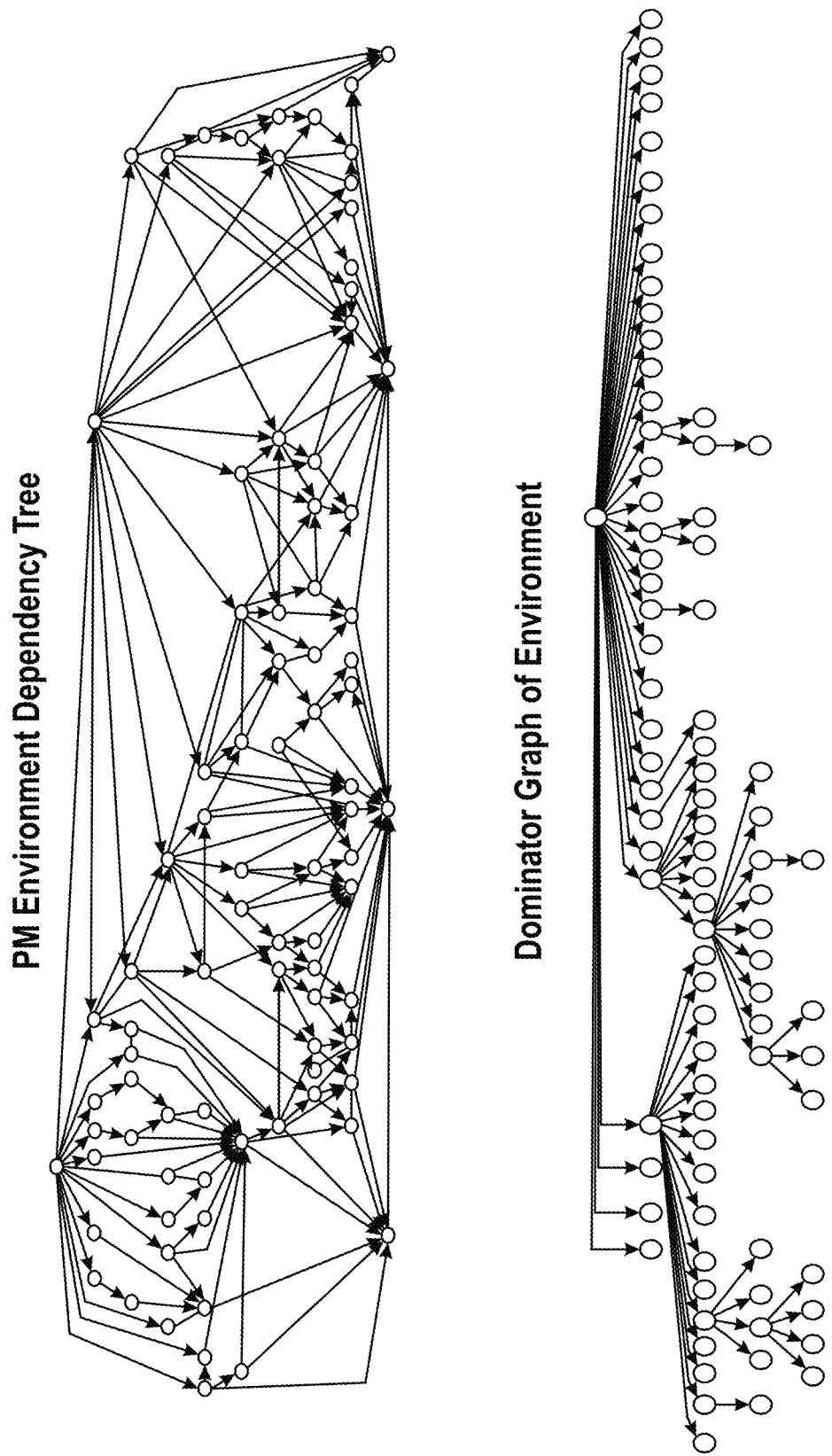
FIG. 7 illustrates an approach to addressing a containerization program layer constraint.

FIG. 7 illustrates an approach to addressing a layer constraint (e.g., through layer compression). For example, some CPs (e.g., Docker) limit the total number of layers (e.g., to 125 or 127 layers). This limit can result from constraints of an operating system (e.g., Linux). Layers can be combined, grouped, or otherwise compressed to address such constraints. For example, a program having 200-300 dependencies can be run using 125 layers or fewer. Thus, a problem can be described by noting that a CP can have an infinite or other very large number of possible packages, whereas a PM can have a constraint of approximately 125 layers per image. A solution is to create a dependency tree, convert it to a dominator tree, and compress. Compressing can occur from the bottom up until the layer limit constraint is satisfied (and, potentially beyond if warranted). Thus, FIG. 7 shows a graph of complicated dependency relationships in a PM environment above, forming a dependency tree. This can be a first step. Below, dependencies have been organized in a dominator graph. This can be a subsequent step. A dominator graph can reveal a potentially optimal way of compressing. For example, a package Y that is only used by another package X can be merged to make a combined package XY. The dominator tree can provide a view of paths and nodes that are completely dominated by another node to enable this efficient compression. An example algorithm consistent with the approach is the Lengauer-Tarjan algorithm.

One reason to address a layer constraint is that some CPs can have a limit on the number of layers that can make up an image (e.g., 127 for Docker). Given that many environments have more than that number of dependencies to function properly, it can be helpful to compress the dependencies into meaningful layers. The manner of compressing layers impacts the likelihood of getting a cache hit in the situation where layers are content addressable (and may be, for example, the smallest unit that can be cached). Desirability of cache hits is described in the description of FIG. 6, for example. Some approaches to compression can be performed with operating system packages rather than PM packages. An advantageous algorithm can consider dependencies in a manner that reflects the likelihood of getting a cache hit and accounts for the dependency size, with a preference on getting cache hits for larger dependencies. If package A always depends on B and B isn't a dependency in any other package, then A and B can be compressed into AB without decreasing likelihood of a cache hit. This results in one fewer layers. This compression can be repeated until the total number of layers falls within the maximum number of layers allowed.

An algorithm that accomplishes some or all of the above benefits can be as follows:
1. Convert the list of packages from the conda solve into a dependency tree;
2. Compute the dominator tree from this input graph;
    a. Use the Lengauer-Tarjan algorithm (T. Lengauer and R. E. Tarjan, A fast algorithm for finding dominators in a flowgraph. ACM Trans. Program. Lang. Syst. 1, 1, 1979, pp. 121-14).
    b. Runs in $O(E*log(V))$ where E is the number of edges in the dependency graph and V is the number of vertices. (An improved version of this algorithm can be implemented in Java).
3. Given the dominator graph, rank each dependency at each depth by the size of the layer (to optimistically keep larger layers as their own dependency).
4. Create individual layers from the dependencies until a layer limit is achieved.
5. Once a layer limit is achieved, compress the remaining dependencies into their parent dependency if possible.
6. If a layer can't be compressed to its parent (e.g., due to it having root as a parent), compress it with it's neighbor based on size.

An example illustration of results from performing step 1, a dependency graph for the resolved dependencies, is provided at the top of FIG. 7. An example illustration of the results from performing step 2 (using the dependency graph to compute the dominator graph) is provided at the bottom of FIG. 7. This can be compressed into 30 layers, for example.

A modified version of the above algorithm can be better, in some circumstances. For example, the global popularity of each package across the entire PM repository can be used to influence the decisions of the algorithm. Although this may affect speed (e.g., because it may require building the popularity of each dependency into a repository), this may be done at startup, for example, and not affect later speed. Some versions of a useful algorithm (e.g., the Lengauer-Tarjan algorithm) can reduce the constant factors of the runtime.

Improved Efficiency

Various efficiencies are provided by the described systems and methods. For example, an old approach can have five steps: (1) findModule; (2) podCreate; (3) PMSolve; (4) PMDownload; and (5) PMInstall. Step 1 can include finding a physical host somewhere for an environment to run on. Step 2 can include creating a SASCA unit (e.g., a Kubernetes pod). Step 3 can include the time and computationally intensive step of doing a PM solve. Step 4 can include downloading all the packages after the solve. Step 5 can include installing the downloaded packages. A new approach can avoid the time-consuming third step, as well as the last two steps. For example, one approach simply has two steps of (1) findModule and (2) podCreate. This can reduce critical path time complexity. In this shorter approach, creating a pod can also involve downloading a CP image for a pod, which can be a slightly larger image than in the first approach. However, extra time required depends on download speeds. Accordingly, the shorter approach scales at a rate of download speeds (linear scaling) as opposed to poor scaling of PM solving (e.g., which can scale exponentially due to the number of dependency trees it may need to analyze).

Figure 8:
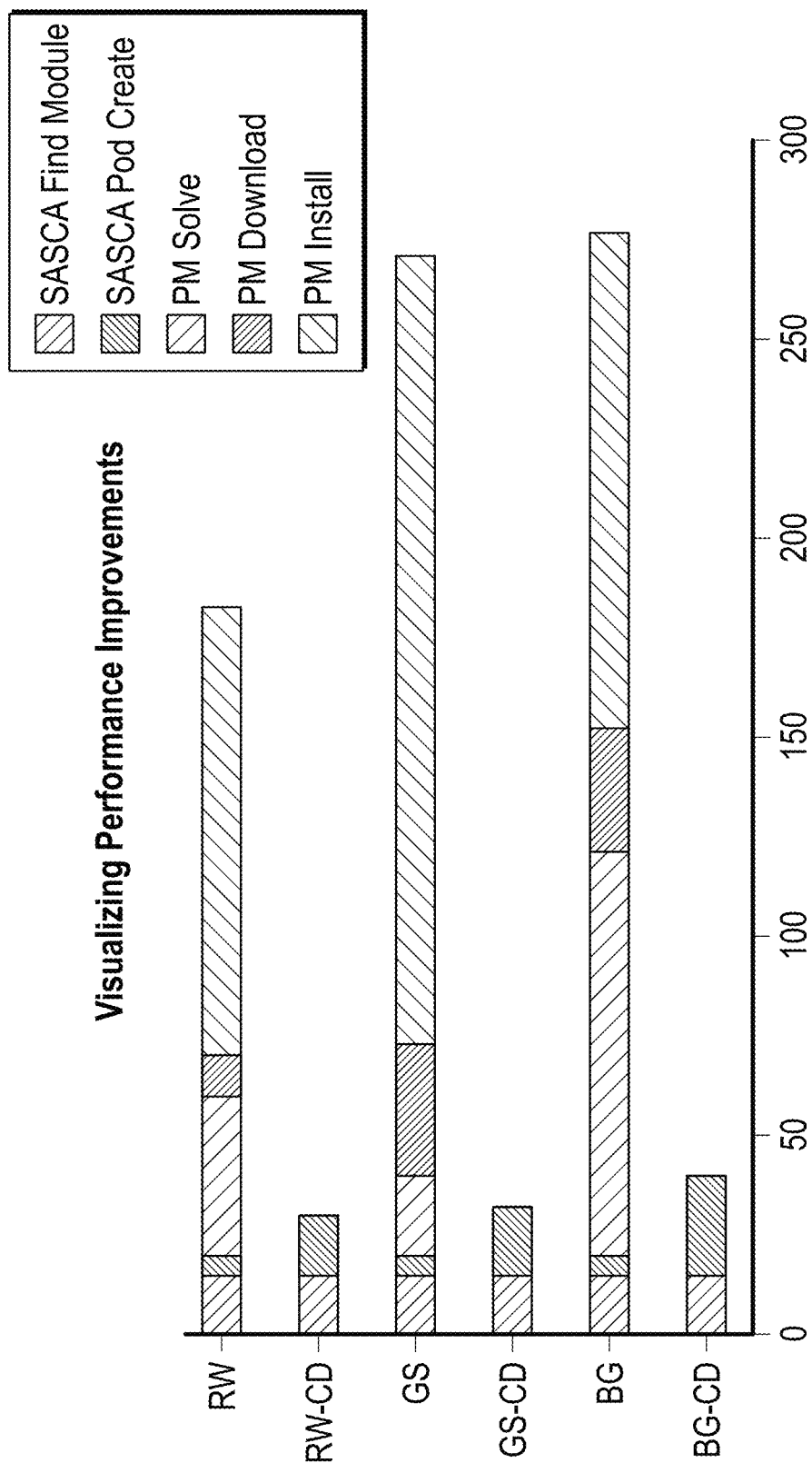
FIG. 8 illustrates performance improvements from the described systems and methods.

FIG. 8 shows a way of visualizing the performance improvements described above. Although the improvements illustrated here were initially developed as theory, empirical data for improvements in time generally matches the results shown here. A left-right axis shows time (in seconds) for establishing a user environment as described herein. Base approaches are labeled RW, GS, and BG, representing different environment types or applications (e.g., examples of EUS). Below each of these is shown a counterpart that is further labeled "CD," showing results from an example new approach in accordance with the present disclosure. In each row, the duration of each step in a startup sequence is shown and labeled according to the key at the top right. In this example, the PM is "Conda" and a SASCA is Rubix/Kubernetes. First, duration of a SASCA Find Module is designated; second, duration of a SASCA Pod Create; third, duration of a PM Solve; fourth, duration of a PM Download; and fifth, duration of a PM Install, which completes the relevant process. In each case, the new (CD) approach is much faster overall (as shown by the shorter total length of the time bars for the "CD" data), despite increases in the duration of the SASCA Pod Create step in the CD approaches.

A PM solve is not often necessary because cached CP images are already available for most users. In contrast to an expensive warm module approach, where expected default environments were already present and running in an expensive and resource-intensive warm module queue, the cache is present in a CP image that can contain all the information needed to quickly rebuild that environment. The improved approach (using cached CP images instead of warm modules) is also more agile because it rapidly scales even if a number of users spikes unexpectedly. A total number of warm modules predicted to be needed may have been too low for the ultimate need, but this deficiency may not be apparent until it is too late to spin up enough warm modules. In contrast, numerous CP images can be retrieved quickly on the fly.

Related solutions may not use cached CP images or CP layers. For example, environments can be pre-solved for a given user and cached without using a PM. For example, if a user does not want to or cannot use a particular SASCA—for example, if a user prefers Yarn instead of Rubix (Kubernetes)—instead of caching the environment as a CP image, a service provider can cache a solved dependency tree. In this case, performance improvements may not be as dramatic because layers are not shared across VMs on a physical host. This approach may avoid the third step "PM Solve," but it does not avoid the fourth "PM Download" and fifth "PM Install" steps. Moreover, additional steps such as linking between packages may not be avoided or reduced. One reason this approach is not as efficient is that the amount of data to download is greater (as opposed to the CP layer approach, which may only require downloading of a smaller amount—for example, an incrementally unique set of layers that are not already running for other users on that physical server and are therefore not already available for sharing).

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 9:
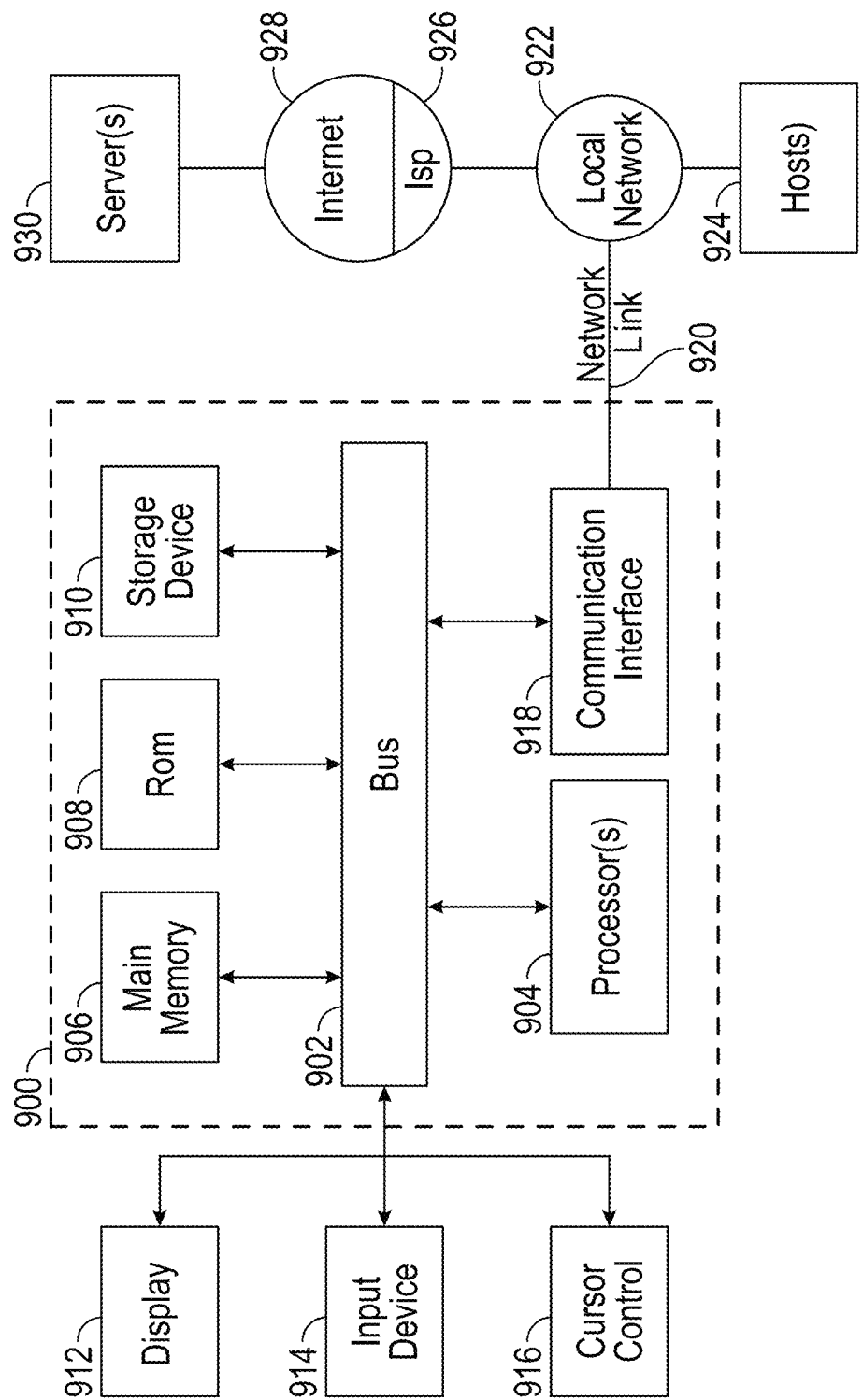
FIG. 9 illustrates a computer system with which certain methods discussed herein may be implemented.

For example, FIG. 9 is a block diagram that illustrates a computer system 900 upon which various embodiments may be implemented. Computer system 900 includes a bus 902 or other communication mechanism for communicating information, and a hardware processor, or multiple processors, 904 coupled with bus 902 for processing information. Hardware processor(s) 904 may be, for example, one or more general purpose microprocessors.

Computer system 900 also includes a main memory 906, such as a random access memory (RAM), cache and/or other dynamic storage devices, coupled to bus 902 for storing information and instructions to be executed by processor 904. Main memory 906 also may be used for storing temporary variables or other intermediate information during execution of instructions to be executed by processor 904. Such instructions, when stored in storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or USB thumb drive (Flash drive), etc., is provided and coupled to bus 902 for storing information and instructions.

Computer system 900 may be coupled via bus 902 to a display 912, such as a cathode ray tube (CRT) or LCD display (or touch screen), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 900 may include a user interface module to implement a GUI that may be stored in a mass storage device as computer executable program instructions that are executed by the computing device(s). Computer system 900 may further, as described below, implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor(s) 904 executing one or more sequences of one or more computer readable program instructions contained in main memory 906. Such instructions may be read into main memory 906 from another storage medium, such as storage device 910. Execution of the sequences of instructions contained in main memory 906 causes processor(s) 904 to perform the process steps described herein. In alternative embodiments, hard-wired circuitry may be used in place of or in combination with software instructions.

Various forms of computer readable storage media may be involved in carrying one or more sequences of one or more computer readable program instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN (or WAN component to communicated with a WAN). Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

The features described herein can be implemented in a remote or distributed computing environment such as a cloud environment. The computer system of FIG. 9 can be used to implement the features described in FIGS. 1-8. For example, the Front End 612 of FIG. 6 can correspond to one or more of the display 912, the input device 914, and/or the cursor control 916 of FIG. 9. The server 614 can be all or a portion of the system 900, the host(s) 924, and/or the server(s) 930. The physical host 630 can be all or a portion of the system 900, the host(s) 924, and/or the server(s) 930. The service 616 can be performed by or hosted on all or a portion of the system 900, the host(s) 924, and/or the server(s) 930. The internet 928, the local network 922, and the network link 920 can facilitate the transfer of information described above (e.g., in FIG. 6) between modules and/or locations. One or more storage devices 910 can play the role of the CP environment cache 615, the CP layer cache 634, the solve cache 618, and/or the layer cache 619, for example. The processor 904 can perform one or more aspects of the solve step, layer step, and/or image step discussed above (see discussion of FIG. 6, for example).

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of reducing startup latency and sharing resources in computing environments, the method comprising:

tracking initial user environment request information and code dependencies necessary to establish those environments, and storing that information and those dependencies in an environment cache as immutable layers that together form a cached environment;

analyzing usage by a particular user to organize code dependencies into base layers comprising code predicted for future request by that user for running environments and additional layers comprising code not commonly requested by that user for running remote environments, and pre-caching the base layers;

receiving a first incoming user environment request and searching the environment cache to determine that the requested environment is new (not present in the environment cache);

when the first requested environment is new, simultaneously:
  establishing an environment in a physical host from a previously cached environment and passing control of that previously cached environment to the user for interim use; and
  performing just-in-time image generation by:
    using new dependencies to compute new layers;
    combining the new layers with at least one pre-cached base layer to form a new image for the new requested environment;
    caching the new image in the environment cache;
    using the new image to establish an environment in a physical host; and
    passing control of that environment to the user to replace the previously cached environment;

receiving a second incoming user environment request; and sharing resources to establish a corresponding environment on that physical host by:
  searching the layer cache for layers that are common to the environments of the first and second incoming requests, and
  using only one instance of each common layer to simultaneously support both environments on the same physical host.

2. The method of claim 1, wherein:

storing that information and those dependencies in an environment cache as immutable layers comprises decomposing the environment into its dependencies and repackaging those dependencies as individual layers; and the method uses the individual layers to build a custom multi-layer image in response to and satisfying the first incoming user environment request.

3. A method of just in time image generation using container layers in a computing environment, the method comprising:

tracking user environment requests and code dependencies necessary to establish the requested environments, and storing container layers of at least one previously established environment as a cached environment in an environment cache;

pre-caching base container layers for predicted future use;

receiving a user request to establish a first application instance on a server, the application instance requiring an environment with user specified code dependencies;

searching the environment cache to determine that the environment required by the first application instance is not present in the environment cache; and when the environment required by the first application instance is determined to not be present in the environment cache, concurrently:
  establishing an environment from a cached environment in the environment cache and passing control of the established environment to the user for interim use; and
  performing just-in-time image generation by:
    retrieving one of the pre-cached base container layers;
    computing new container layers according to the user specified code dependencies;
    combining the retrieved base container layer with the new container layers to form a custom image;
    using the custom image to establish the first application instance on the server; and
    passing control of the established first application instance to the user to replace the environment established from the previously cached environment.

4. The method of claim 3, further comprising caching the custom image for possible later use when similar requests are received from the same user.

5. The method of claim 3, wherein computing new container layers comprises solving for dependencies and using a dominator algorithm applied to a dependency tree to compress the number of layers and thereby comply with a layer constraint.

6. The method of claim 5, wherein the layer constraint requires that the total number of layers not exceed a threshold and the dominator algorithm analyzes nodes and paths of the dependency tree and combines sub nodes and super nodes where the sub nodes are completely dominated by the dominating super node.

7. The method of claim 6, wherein the dominator algorithm comprises the Lengauer-Tarjan algorithm.

8. The method of claim 3, further comprising providing for shared resources on the server by:
  caching, in a local layer cache on the server, container layers used by the first application instance;
  receiving a user request to establish a second application instance on a server;
  searching the local layer cache for layers that are common to both the first and second application instances; and
  running on that server only a single instance of each common layer, wherein that single instance is shared by both application instances.

* * * * *